United States Patent
Kokko et al.

(10) Patent No.: US 9,434,798 B2
(45) Date of Patent: Sep. 6, 2016

(54) CROSS-LINKABLE POLYETHYLENE RESIN FOR PIPES MADE BY A SINGLE-SITE CATALYST

(71) Applicant: BOREALIS AG, Vienna (AT)

(72) Inventors: Esa Kokko, Vantaa (FI); Anneli Pakkanen, Vasterskog (FI); Markku Vahteri, Porvoo (FI); Magnus Palmlof, Vastra Frolunda (SE); Jeroen Oderkerk, Stenungsund (SE)

(73) Assignee: BOREALIS AG, Vienna (AT)

( * ) Notice: Subject to any disclaimer, the term of this patent is extended or adjusted under 35 U.S.C. 154(b) by 467 days.

(21) Appl. No.: 14/089,573

(22) Filed: Nov. 25, 2013

(65) Prior Publication Data

US 2014/0183797 A1 Jul. 3, 2014

Related U.S. Application Data

(62) Division of application No. 13/127,028, filed as application No. PCT/EP2009/007785 on Oct. 30, 2009, now abandoned.

(30) Foreign Application Priority Data

Oct. 31, 2008 (EP) .................................. 08253578

(51) Int. Cl.
*C08F 8/00* (2006.01)
*C08F 2/00* (2006.01)
(Continued)

(52) U.S. Cl.
CPC ........... *C08F 110/02* (2013.01); *B29D 23/001* (2013.01); *C08F 10/00* (2013.01);
(Continued)

(58) Field of Classification Search
CPC .... C08F 10/10; C08F 110/02; C08F 297/08; C08F 297/083; C08F 4/65925; C08F 2/001; C08F 4/65912; C08F 4/65916; C08F 2500/02; C08F 2500/12; C08F 2500/19; C08L 23/04; C08L 2205/02; C08L 2666/06; F16L 9/12; F16L 11/04; B29D 23/001; Y01T 428/139
USPC .............................. 264/634; 525/55; 526/64
See application file for complete search history.

(56) References Cited

U.S. PATENT DOCUMENTS 6,380,328 B1  4/2002  McConville et al.
2004/0167293 A1  8/2004  Palmlof et al.
(Continued)

FOREIGN PATENT DOCUMENTS

EP  1 574 772 A1 *  9/2005
EP  1574772  9/2005
(Continued)

OTHER PUBLICATIONS

International Search Report issued for PCT/EP2009/007786, dated Mar. 4, 2010.
(Continued)

*Primary Examiner* — William Cheung
(74) *Attorney, Agent, or Firm* — Knobbe, Martens, Olson & Bear LLP

(57) ABSTRACT

An ethylene polymer with a density of less than 955 kg/m$^3$ obtained by polymerisation with a single-site catalyst and having a shear thinning index $SHI_{2.7/210}$ of less than 5 wherein ethylene polymer comprises two components.

14 Claims, 1 Drawing Sheet

(51) Int. Cl.

| | |
|---|---|
| *B28B 1/00* | (2006.01) |
| *C08F 110/02* | (2006.01) |
| *C08F 10/00* | (2006.01) |
| *C08F 297/08* | (2006.01) |
| *C08L 23/04* | (2006.01) |
| *F16L 9/12* | (2006.01) |
| *F16L 11/04* | (2006.01) |
| *B29D 23/00* | (2006.01) |
| *C08F 4/659* | (2006.01) |

(52) U.S. Cl.
CPC ........ *C08F 297/08* (2013.01); *C08F 297/083* (2013.01); *C08L 23/04* (2013.01); *F16L 9/12* (2013.01); *F16L 11/04* (2013.01); *C08F 4/65912* (2013.01); *C08F 4/65916* (2013.01); *C08L 2205/02* (2013.01); *Y10T 428/139* (2015.01)

(56) References Cited

U.S. PATENT DOCUMENTS

| | | |
|---|---|---|
| 2005/0031813 A1 | 2/2005 | Conrnette et al. |
| 2007/0048472 A1 | 3/2007 | Krishnaswamy et al. |

FOREIGN PATENT DOCUMENTS

| | | |
|---|---|---|
| EP | 1927626 | 6/2008 |
| EP | 1927627 | 6/2008 |
| EP | 1950241 | 7/2008 |
| EP | 2285897 | 2/2011 |
| EP | 2285893 | 9/2011 |
| JP | 10193468 | 7/1998 |
| JP | 11320651 | 11/1999 |
| JP | 2000/009265 | 11/2000 |
| WO | 00/01765 | 1/2000 |
| WO | 01/53367 | 7/2001 |
| WO | 02/46297 | 6/2002 |
| WO | 2005/095838 | 10/2005 |

OTHER PUBLICATIONS

International Search Report issued for PCT/EP2009/007783, dated Jan. 26, 2010.

International Search Report issued for PCT/EP2009/007784, dated Jan. 29, 2010.

International Search Report issued for PCT/EP2009/007785, dated Jan. 22, 2010.

* cited by examiner

CROSS-LINKABLE POLYETHYLENE RESIN FOR PIPES MADE BY A SINGLE-SITE CATALYST

This application is a divisional application of U.S. patent application Ser. No. 13/127,028, which has been abandoned Nov. 26, 2013, which is a National Stage Entry of PCT International Patent Application Serial. No. PCT/EP2009/007785 filed Oct. 30, 2009; which claims the benefit of European Patent Application Serial No. EP 08253578.2, filed Oct. 31, 2008. The disclosure of each of these applications is incorporated herein by reference in its entirety.

This invention concerns a process for the manufacture of a cross-linkable polyethylene as well as the cross-linkable polyethylene itself. The invention also covers a cross-linked polyethylene and articles, preferably pipes, made from the cross-linked polyethylene.

The use of polymers for pipes for various purposes, such as fluid transport, e.g. transport of liquids or gases such as water or natural gas is known. It is common for the fluid to be pressurised in these pipes. Such pipes can be made of polyethylene such as medium density polyethylene (MDPE) or high density polyethylene (HDPE), typically having a density of about 950 kg/m$^3$.

Traditionally, polymers for polyethylene crosslinked (PEX) pipe production have been made of unimodal resins made in a single reactor using traditional catalysts, such as chromium catalysts.

The polymers disclosed in examples 1 and 2 of WO2005/095838 are unimodal resins. However, rather than traditional Ziegler-Natta catalysis, single site catalyst technology is used to improve the properties of the formed materials compared to the use of Ziegler-Natta catalysts. In comparison to Ziegler-Natta polyethylene, the use of a single site catalyst will lead to better defined molecular characteristics, e.g. narrow molecular weight distribution (MWD) and even comonomer distribution.

Polymerisation in only one reactor leads, however, to a relatively short residence time (and only one residence time) for the polymerising particles. This leads to a situation where some particles are not polymerised at all and some particles are only polymerised to a limited degree which leads to an increased risk of silica gel particles.

The risk of silica gels can be reduced by using a catalyst with enhanced internal homogeneity however even the most effective single site catalyst still gives rise to problematic levels of gels.

The lower residence time and incomplete particle polymerisation can also result in a reduction in production rate.

Ideally therefore, the formation of the desired polymers should be carried out in multiple stages. EP-A-1950241 describes multimodal medium density polyethylene polymer compositions comprising a lower molecular weight ethylene homopolymer component and a higher molecular weight ethylene copolymer component for use in the manufacture of films. The use of multimodal polymers for pipe manufacture is also known. In WO00/01765 a multimodal polymer is suggested for use in pipe manufacture but it has a very broad molecular weight distribution (MWD). Even typical multimodal single site polymers have molecular weight distributions of around 10.

The use of a multistage polymerisation inevitably leads to the formation of two or more components in the polymer and hence a much broader MWD than a unimodal material. The properties of the single site polymer are however much better in terms of crosslinking behaviour and flexibility is better than with a chromium or Ziegler-Natta catalyst It has now been shown that the problem of uneconomical production of unimodal single site resins when using only one reactor can be overcome. The inventors have found that two component polymers can be produced using single site catalysis (SSC), typically in two or more reactors, whilst still achieving the properties found ideal in a unimodal material. The inventors have therefore been able to produce a polymer which performs as well as a unimodal SSC polyethylene but in much greater yield.

The key is to produce a nominally unimodal material but from two components, preferably in two steps. This is achieved by manufacturing similar components, in particular in terms of MWD, in each reactor thus forming a unimodal polymer in a process which would normally give a multimodal polymer.

Other problems such as gels, low activity and high yellowness index can also be reduced using two or more reactors in a series for the production of unimodal polymers.

By employing at least two reactors in series, the total residence time increases and a particle that may not be polymerised in the first reactor is likely to polymerise in the second reactor and consequently the number of unreacted particles should decrease. This results in higher production rates, lower gels and lower yellowness index. The narrow molecular weight distribution also contributes to excellent cross-linkability.

Thus viewed from a first aspect the invention provides an ethylene polymer with a density of less than 955 kg/m$^3$ obtained by polymerisation with a single-site catalyst, e.g. a metallocene catalyst, and having a shear thinning index SHI$_{2.7/210}$ of less than 5 wherein the ethylene polymer comprises at least two components.

Viewed from another aspect the invention provides an ethylene polymer with a density of less than 955 kg/m$^3$ obtained by polymerisation with a single-site catalyst, e.g. a metallocene catalyst, and having a shear thinning index SHI$_{2.7/210}$ of less than 5 wherein the ethylene polymer comprises at least two components and an ash content of less than 250 ppm.

Viewed from another aspect the invention provides a polymer composition comprising an ethylene polymer as hereinbefore defined and at least one additive and/or other olefinic component.

Viewed another aspect the invention provides a process for the preparation of an ethylene polymer comprising:
(I) polymerising ethylene and optionally at least one comonomer in a first stage in the presence of a single site catalyst;
(II) polymerising ethylene and optionally at least one comonomer in a second stage in the presence of the same single site catalyst;
so as to form an ethylene polymer as hereinbefore described, e.g. an ethylene polymer with a density of less than 955 kg/m$^3$ obtained by polymerisation with a single-site catalyst, e.g. a metallocene catalyst, and having a shear thinning index SHI$_{2.7/210}$ of less than 5 wherein the ethylene polymer comprises at least two components.

Viewed from another aspect the invention provides a cross-linked polyethylene comprising an ethylene polymer as hereinbefore defined which has been cross-linked.

Viewed from another aspect the invention provides the use of an ethylene polymer as hereinbefore described in the manufacture of a cross-linked pipe.

Viewed from another aspect the invention provides a process for the preparation of a crosslinked ethylene polymer pipe comprising forming the ethylene polymer as hereinbefore described into a pipe by extrusion and crosslinking it.

Ethylene Polymer

The ethylene polymer of the present invention has a density of less than 955 kg/m$^3$, preferably at most 952 kg/m$^3$. Ideally the polymer will have a density of at least 920 kg/m$^3$, e.g. at least 925 kg/m$^3$. A preferred density range may be 932-950 kg/m$^3$, especially 940 to 950 kg/m$^3$. This density is made possible by the single-site catalysed polymerisation of the ethylene polymer and has several advantages. In terms of pipe manufacture, the relatively low density polymer means that the pipe prepared therefrom is more flexible. This is of importance, inter alfa, for pipes intended, e.g. for floor heating. Further, a lower density ethylene polymer base resin means a lower crystallinity which in turn means that less energy is required to melt the polymer. This results in an enhanced production speed when manufacturing pipes.

Still further and importantly, the lower density/crystallinity single-site catalysed ethylene polymer of the present invention surprisingly gives the same or improved pressure test performance as prior art materials with higher density/crystallinity, i.e. a certain pressure test performance can be obtained with a more flexible pipe according to the present invention than with a traditional material with higher density and crystallinity.

The ethylene polymer of the invention preferably has a $MFR_{21}$ of 0.1-30 g/10 min, more preferably 0.1-15 g/10 min. Advantageous polymers have $MFR_{21}$ values of less than 5 g/10 min, e.g. less than 3 g/10 min. The MFR is an indication of the flowability, and hence the processability, of the polymer. The higher the melt flow rate, the lower the viscosity of the polymer.

$MFR_5$ values may range from 0.01 to 2 g/10 min. Ideally the $MFR_5$ value is less than 2 g/10 min, especially less than 1 g/10 min.

The ethylene polymers of the invention preferably have relatively high molecular weights. For example, $M_w$ should be at least 150,000, preferably at least 200,000, especially at least 225,000.

$M_n$ values are also high. $M_n$ is preferably at least 50,000, more preferably at least 75,000, especially at least 80,000.

The single-site catalysed ethylene polymer of the present invention has a narrow molecular weight distribution as defined by its shear thinning index (SHI). The SHI is the ratio of the complex viscosity ($\eta^*$) at two different shear stresses and is a measure of the broadness (or narrowness) of the molecular weight distribution. According to the present invention the ethylene polymer has a shear thinning index $SHI_{2.7/210}$, i.e. a ratio of the complex viscosity at 190° C. and a shear stress of 2.7 kPa($\eta^*_{2.7\ kPa}$) and the complex viscosity at 190° C. and a shear stress of 210 kPa($\eta^*_{210\ kPa}$), of less than 5, preferably less than 4.5, especially less than 4, more especially less than 3.5, e.g. in the range 1 to 4.5, especially in the range 1 to 4.

Thus, the ethylene polymer of the invention has a very low SHI value despite comprising at least two components. It is believed that the manufacture of a two component ethylene polymer having an SHI value of less than 5 is new and this forms an important feature of the invention.

Another way to measure molecular weight distribution (MWD) is by GPC. The molecular weight distribution ($M_w/M_n$ value) according to the present invention is preferably less than 4, preferably less than 3.5, more preferably less than 3.

The narrow molecular weight distribution enhances crosslinkability, e.g. less peroxide or radiation is required to obtain a certain crosslinking degree.

According to a preferred embodiment of the invention the ethylene polymer has a complex viscosity at a shear stress of 5 kPa/190° C. ($\eta^*_{5\ kPa}$), of at least 50,000 Pas, more preferably at least 100,000 Pas.

According to another preferred embodiment of the invention the ethylene polymer has a complex viscosity at a shear stress of 2.7 kPa/190° C., ($\eta^*_{2.7\ kPa}$), of at least 100,000 Pas, more preferably at least 120,000 Pas.

A further benefit of the process of the invention and hence of the polymers of the invention is low ash content and excellent particle size distribution. High ash content samples are more prone to oxidation and by using a two reactor process, the formed polymers have less ash and a much more even distribution of ash with absence of particles with very high ash content. Low ash content is particularly advantageous in a RAM process, which is a sintering process.

The term ash content is used herein to designate the amount of ash particles in the polymers of the invention. The ash content of the ethylene polymer of the invention may be less than 250 ppm, preferably less than 200 ppm, especially less than 175 ppm. It will be appreciated that ash contents are effected by polymerisation conditions, especially the partial pressure of ethylene used during the polymerisation. Lower ethylene partial pressures tend to cause more ash.

It is also observed that the process of the invention ensures a better ash content distribution (i.e. an ash present is distributed across a broader range of particles and is not concentrated in a particular particle size fraction). It has been noted that high levels of ash are particularly prevalent in smaller particles when the polymer is unimodal and made in a single polymerisation stage. High ash content is thus a major issue in particles which pass through a 0.355 mm sieve, i.e. have a diameter less than 0.355 mm. In the present invention ash content in particles of less than 0.355 mm can be less than 300 ppm, preferably less than 250 ppm.

The smaller the particles, the more significant the ash content issues. In particles which pass through a 0.25 mm sieve the ash content is preferably less than 300 ppm, preferably less than 260 ppm.

For particles which pass through a 0.1 mm sieve ash contents are preferably less than 300 ppm.

A low ash content is also associated with low yellowness indices for articles made from the polymer. Thus, articles made from the ethylene polymer of the invention (preferably the cross-linked ethylene polymer of the invention) may have yellowness indices of less than 2, preferably less than 1.5.

The ethylene polymer of the invention comprises two components. Whilst the ethylene polymer may be manufactured by blending, the ethylene polymer of the invention is preferably produced in situ and in at least two stages, ideally two stages only, and therefore contains at least two fractions, preferably two fractions only.

Nevertheless, the ethylene polymer of the invention is regarded as unimodal, as indicated, inter alia, by the very low SHI values. The term unimodal is used herein to mean that the GPC curve of the polymer contains a single peak. This means that the two components of the polymer are so similar, particularly in terms of molecular weight distribution, that they cannot be distinguished in a GPC curve.

The analytical tests section contains details of how to measure a GPC curve according to this invention.

In order to manufacture the ethylene polymer of the invention, it is important therefore to control MWD such that the MWD of the two components are similar or even the same. It is preferred therefore if the monomers/comonomers used in each stage of the process are the same.

Moreover, the properties of the two components produced in each stage are preferably similar.

Preferably therefore the value of $MFR_{21}$ of the polymer of the invention to the $MFR_{21}$ of the first component of the polymer should not differ by more than a factor 5, preferably by no more than a factor 4.

The polymer of the invention is prepared by single-site catalysed polymerisation and has a narrow molecular weight distribution. The use of a single-site catalysed ethylene polymer gives better pressure test performance for a given density level than corresponding prior art materials. Therefore, a polymer of lower density may be used which results in a more flexible pipe. Moreover, a polymer of lower density also requires less energy to melt which is beneficial in terms of pipe manufacturing. Further, the use of single site catalysed low MFR polymer allows a lower amount of crosslinking agent to be used to reach the desired degree of crosslinking.

The ethylene polymer as defined above may be made using any conventional single site catalysts, including metallocenes and non-metallocenes as well known in the field, preferably metallocenes.

Preferably said catalyst is one comprising a metal coordinated by one or more η-bonding ligands. Such η-bonded metals are typically transition metals of Group 3 to 10, e.g. Zr, Hf or Ti, especially Zr or Hf. The η-bonding ligand is typically an $\eta^5$-cyclic ligand, i.e. a homo or heterocyclic cyclopentadienyl group optionally with fused or pendant substituents. Such single site, preferably metallocene, procatalysts have been widely described in the scientific and patent literature for about twenty years. Procatalyst refers herein to said transition metal complex.

The metallocene procatalyst may have a formula II:

$$(Cp)_m R_n MX_q \quad (II)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR'$_3$, —OSiR'$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl)silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. —SiR$^1$$_2$—, wherein each R$^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$, —SiR"$_3$, —OSiR"$_3$, —NR"$_2$ or —CH$_2$—Y, wherein Y is $C_6$-$C_{20}$-aryl, $C_6$-$C_{20}$-heteroaryl, $C_1$-$C_{20}$-alkoxy, $C_6$-$C_{20}$-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R$^1$ can further be substituted e.g. with $C_1$-$C_{20}$-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

Suitably, in each X as —CH$_2$—Y, each Y is independently selected from $C_6$-$C_{20}$-aryl, NR"$_2$, —SiR"$_3$ or —OSiR"$_3$. Most preferably, X as —CH$_2$—Y is benzyl. Each X other than —CH$_2$—Y is independently halogen, $C_1$-$C_{20}$-alkyl, $C_1$-$C_{20}$-alkoxy, $C_6$-$C_{20}$-aryl, $C_7$-$C_{20}$-arylalkenyl or —NR"$_2$ as defined above, e.g. —N($C_1$-$C_{20}$-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR"$_3$, wherein R" is as indicated above, preferably $C_1$-$C_{20}$-alkyl.

R, if present, is preferably a methylene, ethylene or a silyl bridge, whereby the silyl can be substituted as defined above, e.g. a (dimethyl)Si=, (methylphenyl)Si= or (trimethylsilylmethyl)Si=; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. $C_{1-6}$-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a η$_1$ or η$_2$ ligand, wherein said ligands may or may not be bridged to each other. Such compounds are described e.g. in WO-A-9613529, the contents of which are incorporated herein by reference.

Further preferred metallocenes include those of formula (I)

wherein each X' is halogen, $C_{1-6}$ alkyl, benzyl or hydrogen; Cp' is a cyclopentadienyl or indenyl group optionally substituted by a $C_{1-10}$ hydrocarbyl group or groups and being optionally bridged, e.g. via an ethylene or dimethylsilyl link.

Especially preferred catalysts are bis-(n-butyl cyclopentadienyl) hafnium dichloride, bis-(n-butyl cyclopentadienyl) zirconium dichloride and bis-(n-butyl cyclopentadienyl) hafnium dibenzyl, the last one being especially preferred.

Metallocene procatalysts are generally used as part of a catalyst system which also includes a catalyst activator, called also as cocatalyst. Useful activators are, among others, aluminium compounds, like aluminium alkoxy compounds. Suitable aluminium alkoxy activators are for example methylaluminoxane (MAO), hexaisobutylaluminoxane and tetraisobutylaluminoxane. In addition boron compounds (e.g. a fluoroboron compound such as triphenylpentafluoroboron or triphentylcarbenium tetraphenylpentafluoroborate $((C_6H_5)_3B+B\!\!-\!\!(C_6F_5)_4))$ can be used as activators. The cocatalysts and activators and the preparation of such catalyst systems is well known in the field. For instance, when an aluminium alkoxy compound is used as an activator, the Al/M molar ratio of the catalyst system (Al is the aluminium from the activator and M is the transition metal from the transition metal complex) is suitable from 50 to 500 mol/mol, preferably from 100 to 400 mol/mol. Ratios below or above said ranges are also possible, but the above ranges are often the most useful.

If desired the procatalyst, procatalyst/cocatalyst mixture or a procatalyst/cocatalyst reaction product may be used in supported form (e.g. on a silica or alumina carrier), unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

It is also possible to use combinations of different activators and procatalysts. In addition additives and modifiers and the like can be used, as is known in the art.

Any catalytically active catalyst system including the procatalyst, e.g. metallocene complex, is referred herein as single site or metallocene catalyst (system).

It is preferred if the same single site catalyst is used in each stage of the manufacture of the ethylene polymer of the invention. It is thus preferred if the catalyst added in the first stage of the process is transferred to the second polymerisation stage. This of course maximises residence time and provides improvements in ash content and yields as discussed above.

The ethylene polymer of the invention may be an ethylene homopolymer or copolymer. By ethylene homopolymer is meant a polymer which is formed essentially only from ethylene monomer units, i.e. is 99.9 wt ethylene or more. It will be appreciated that minor traces of other monomers may be present due to industrial ethylene containing trace amounts of other monomers.

The ethylene polymer of the invention may also be a copolymer and can therefore be formed from ethylene with at least one other comonomer, e.g. $C_{3-20}$ olefin. Preferred comonomers are alpha-olefins, especially with 3-8 carbon atoms. Other comonomers of value are dienes. The use of dienes as comonomer increases the level of unsaturation in the polymer and thus is a way to further enhance crosslinkability. Preferred dienes are $C_{4-20}$-dienes where at least one double bond is at the 1-position of the diene. Especially preferred dienes are dienes containing a tertiary double bond. By the term "tertiary double bond" is meant herein a double bond that is substituted by three non-hydrogen groups (e.g. by three alkyl groups).

Preferably, the comonomer is selected from the group consisting of propene, 1-butene, 1-hexene, 4-methyl-1-pentene, 1-octene, 1,7-octadiene and 7-methyl-1,6-octadiene.

The polymers of the invention can comprise one monomer or two monomers or more than 2 monomers. The use of a single comonomer is preferred. If two comonomers are used it is preferred if one is an $C_{3-8}$ alpha-olefin and the other is a diene as hereinbefore defined.

The amount of comonomer is preferably such that it comprises 0-3 mol %, more preferably 0-1.5 mol % and most preferably 0-0.5 mol % of the ethylene polymer.

In order to ensure the narrow molecular weight distribution and hence unimodality, it is preferred if the monomer(s) used to manufacture each component are the same.

It is preferred however if the ethylene polymer of the invention is a homopolymer, i.e. it is preferred if all components of the ethylene polymer of the invention are homopolymers.

As noted above, it is preferred that despite being formed in a multistage process the ethylene polymer of the invention is unimodal. The modality of a polymer refers to the form of its molecular weight distribution curve, i.e. the appearance of the graph of the polymer weight fraction as function of its molecular weight. If the polymer is produced in a several reactor process, utilizing reactors coupled in series and/or with reflux using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima in comparison with the curves for the individual fractions. Such a polymer product, produced in two or more reaction zones, is called bimodal or multimodal depending on the number of zones.

Where there is a single maximum in the curve, the polymer is termed unimodal. In the present case, as each component of the claimed polymer preferably gives rise to a substantially identical GPC curve. Thus, when the components are superimposed the curve still has a single maximum meaning that the polymer is unimodal despite having been formed in a multistage process.

By unimodal therefore is meant that the GPC curve contains a single maximum.

The proportions of the components can vary. It is preferred that the weight ratio between the first fraction and the second fraction lies in the range (30-70):(70-30), more preferably (40-60):(60-40). The first component may be in excess.

Properties of the First Component

The ethylene polymer of the present invention comprises two components, a first component and a second component. The first component preferably has a density of less than 955 $kg/m^3$, preferably at most 950 $kg/m^3$. Ideally the first component will have a density of at least 930 $kg/m^3$, e.g. at least 935 $kg/m^3$. A preferred density range may be 940-952 $kg/m^3$, especially 945 to 950 $kg/m^3$.

The first component of the invention preferably has a MFR$_{21}$ of 0.1-20 g/10 min, more preferably 0.1-10 g/10 min. Advantageous first components have MFR$_{21}$ values of less than 5 g/10 min, e.g. less than 3 g/10 min.

The first component of the invention preferably has relatively high molecular weights. For example, M$_w$, should be at least 150,000, preferably at least 175,000, especially at least 200,000.

M$_n$ values are also high. M$_n$ is preferably at least 50,000, more preferably at least 75,000.

The molecular weight distribution (MWD) of the first component is preferably less than 4, preferably less than 3.5, more preferably less than 3.

The ash content of the first component is typically higher than that of the ethylene polymer of the invention. The use of a two component material enables an overall reduction in ash content. Typically the ash content of the first component is at least 250 ppm, e.g. at least 300 ppm or at least 350 ppm. The total amount will preferably be less than 500 ppm. In one embodiment of the invention the first component has an ash content of at least 250 ppm but the ash content of the ethylene polymer is less than 250 ppm.

Preparation of Cross-Linkable Polymer

For the preparation of the ethylene polymer of the present invention polymerisation appropriately tailored methods well known to the skilled person may be used. The ethylene polymer useful in the present invention is preferably obtained by in-situ blending in a multistage polymerisation process. Accordingly, polymers are preferably obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the polyethylene polymer of the invention is produced in at least two-stage polymerization using the same single site catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor—gas phase reactor system is well known as Borealis technology, i.e. as a BORSTAR™ reactor system. Such a multistage process is disclosed e.g. in EP517868.

For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

In order to ensure the formation of an ethylene polymer comprising at least two components which has the properties claimed herein, it is important to control various polymerization parameters to ensure that the polymer components are such that, for example, the GPC curve has a single peak. Parameters of interest in this regard are hydrogen concentration, ethylene concentration, temperature, pressure, and the hydrogen/ethylene ratio.

A chain-transfer agent, preferably hydrogen, can be added as required to the reactors. It is preferred if the amount of hydrogen used in the manufacture of the first component is very low. Preferably therefore, the amount is less than 1, preferably less than 0.1, e.g. 0.01 to 0.1 mol of H$_2$/kmoles of ethylene are added to the first, e.g. loop reactor.

The amount of hydrogen added to the second reactor, typically gas phase reactor is also quite low but is typically higher than the amounts added to the first reactor. Values may range from 0.05 to 1, e.g. 0.075 to 0.5, especially 0.1 to 0.4 moles of H$_2$/kmoles of ethylene.

The ethylene concentration in the first, preferably loop, reactor may be around 5 to 15 mol %, e.g. 7.5 to 12 mol %.

In the second, preferably gas phase, reactor, ethylene concentration is preferably much higher, e.g. at least 40 mol % such as 45 to 65 mol %, preferably 50 to 60 mol %.

Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

A prepolymerisation step may precede the actual polymerisation process.

The skilled man is able to tailor the conditions used in each stage to ensure that the ethylene polymer formed at the end of process is unimodal, e.g. by ensuring that the MWD of each component of the polymer is similar.

The ethylene polymer of the invention can be blended with any other polymer of interest or used on its own as the only olefinic material in an article. Thus, the ethylene polymer of the invention can be blended with known HDPE, MDPE, LDPE, LLDPE polymers or a mixture of ethylene polymers of the invention could be used. Ideally however any article made from the ethylene polymer is the invention consists essentially of the polymer, i.e. contains the ethylene polymer along with standard polymer additives only.

The ethylene polymer of the invention may be blended with standard additives, fillers and adjuvants known in the art. It may also contain additional polymers, such as carrier polymers of the additive masterbatches. Preferably the ethylene polymer comprises at least 50% by weight of any polymer composition containing the ethylene polymer, preferably from 80 to 100% by weight and more preferably from 85 to 100% by weight, based on the total weight of the composition.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'- hydroxyphenyl)propionate (sold, e.g., by Ciba Specialty Chemicals under the trade name of Irganox 1076) and 2,5,7,8-tetramethyl-2(4',8',12'-trimethyltridecyl)chroman-6-ol (sold, e.g., by BASF under the trade name of Alpha-Tocopherol).

Examples of phosphates and phosphonites are tris (2,4-di-t-butylphenyl) phosphite (sold, e.g., by Ciba Specialty Chemicals under the trade name of Irgafos 168), tetrakis-(2,4-di-t-butylphenyl)-4,4'-biphenylen-di-phosphonite (sold, e.g., by Ciba Specialty Chemicals under the trade name of Irgafos P-EPQ) and tris-(nonylphenyl)phosphate (sold, e.g., by Dover Chemical under the trade name of Doverphos HiPure 4)

Examples of sulphur-containing antioxidants are dilauryl-thiodipropionate (sold, e.g., by Ciba Specialty chemicals under the trade name of Irganox PS 800), and distearylth-iodipropionate (sold, e.g., by Chemtura under the trade name of Lowinox DSTDB).

Examples of nitrogen-containing antioxidants are 4,4'-bis (1,1'-dimethylbenzyl)diphenylamine (sold, e.g., by Chemtura under the trade name of Naugard 445), polymer of 2,2,4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Specialty Chemicals.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM 1805 by Poly Plast Muller. Also titanium dioxide may be used as an UV-screener.

Applications

The polymer of the invention is cross-linkable and is ideal for use in the formation of cross-linked pipes. Cross-linking of the polymer/pipe can be achieved in conventional ways e.g. using peroxide, irradiation or silane cross-linkers. In peroxide crosslinking, the crosslinking takes place by the addition of peroxide compounds, such as dicumyl peroxide, which form free radicals. Cross-linking can also be achieved by irradiation or using silanes.

At a predetermined amount of peroxide or irradiation, a lower molecular weight (higher MFR) polymer may be used than in the prior art. According to the present invention the absence of very low molecular weight tail in single-site catalyst polymers results in improved crosslinkability.

Low molecular weight polymers require a higher amount of peroxide to achieve an efficient network structure.

Peroxide cross-linking is preferred.

The polymers of the invention can exhibit a cross-linking degree of at least 70%, e.g. at least 80%, preferably at least 85%. In particular, the ethylene polymer of the invention may have a degree of crosslinking ≥70% as measured according to ASTM D 2765-01, Method A when using 0.4% Trigonox 145 E85. (Trigonox 145 E 85 is an oil solution that contains 85 wt-% 2,5-dimethyl-2,5-ditertbutylperoxy hexyne). The peroxide is diluted in the oil to make it less hazardous and easier to handle)

The amount of peroxide added to effect cross-linking may vary but amounts such as 0.2 to 1 wt %, preferably 0.3 to 0.7 wt % are ideal.

It is preferred if the ethylene polymer of the invention has a degree of crosslinking corresponding to a torque of at least 11 dNm, preferably at least 14 dNm after 3.5 minutes as measured by Monsanto device when using 0.4% Trigonox 145 E85 as detailed below.

Pipes according to the present invention are produced according to the methods known in the art. Thus, according to one preferred method the polymer composition is extruded through an annular die to a desired internal diameter, after which the pipe is cooled.

Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe against the walls of the sizing chamber.

After the sizing the pipe is cooled, typically in a water bath having a length of about 5 meters or more.

The pipes according to the present invention preferably fulfill the requirements of PE80 standard as defined in EN 12201 and EN 1555, alternatively ISO 4427 and ISO 4437, evaluated according to ISO 9080. Especially preferably the pipes fulfill EN ISO 15875.

Generally, polymer pipes are manufactured by extrusion. The polymers of the invention may be used for the manufacture of any type of pipe and hence be used with any extruding process.

For example, a conventional plant for screw extrusion of PEX polymer pipes comprises a single or double screw extruder, a nozzle, a calibrating device, a crosslinking unit, cooling equipment, a pulling device, and a device for cutting or for coiling-up the pipe. The polymer, pre-soaked with a suitable amount of peroxide is extruded into a pipe from the extruder and thereafter the pipe is crosslinked in the cross-linking unit. This screw extrusion technique is well known to the skilled person and no further particulars should therefore be necessary here Another type of extrusion of polymer pipes is the so-called ram extrusion where peroxide soaked polymer powder is charged batchwise into an extrusion cylinder and compressed with a ram in the heated zone of the extrusion cylinder. Melting and crosslinking of the polymer takes place simultaneously. After a charge has been pressed the ram is lifted, the crosslinked pipe is expelled and another charge of polymer is metered into the extrusion cylinder.

The pipe of the present invention is prepared by extrusion and more particularly by screw extrusion or especially ram extrusion.

It will be appreciated that the preferred features of the polymers of the invention as described herein can all be combined with each other in any way.

BRIEF DESCRIPTION OF THE DRAWINGS

The invention will now be described with reference to the following non limiting examples and figures.

ANALYTICAL TESTS

Figure 1:
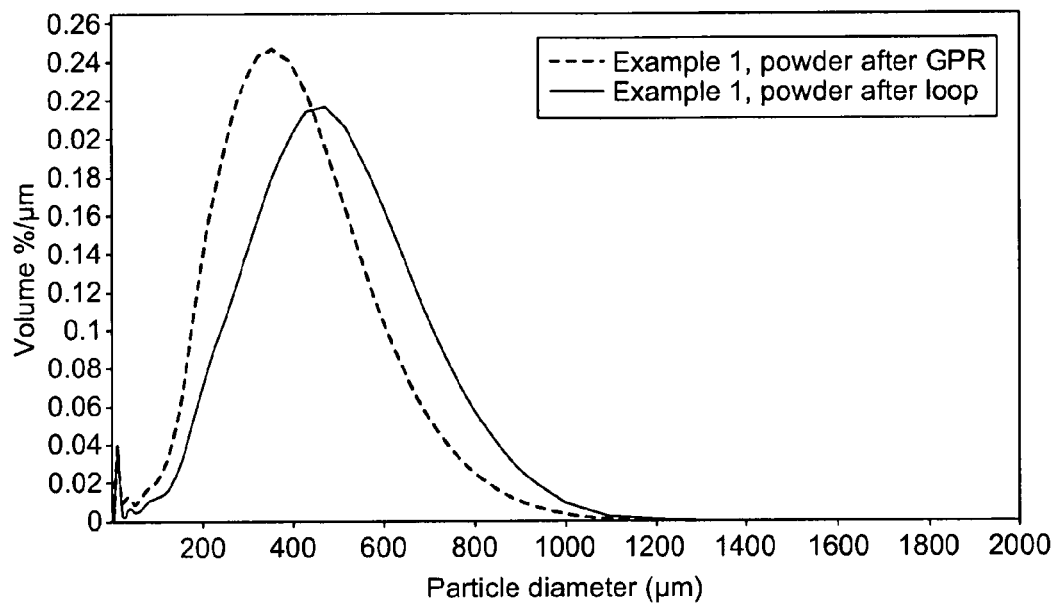
FIG. 1 shows the particle size distribution (PSD) for Polymer 1 of the examples. The average particle size of loop made particles is clearly smaller as compared to GPR made particles.
Figure 2:
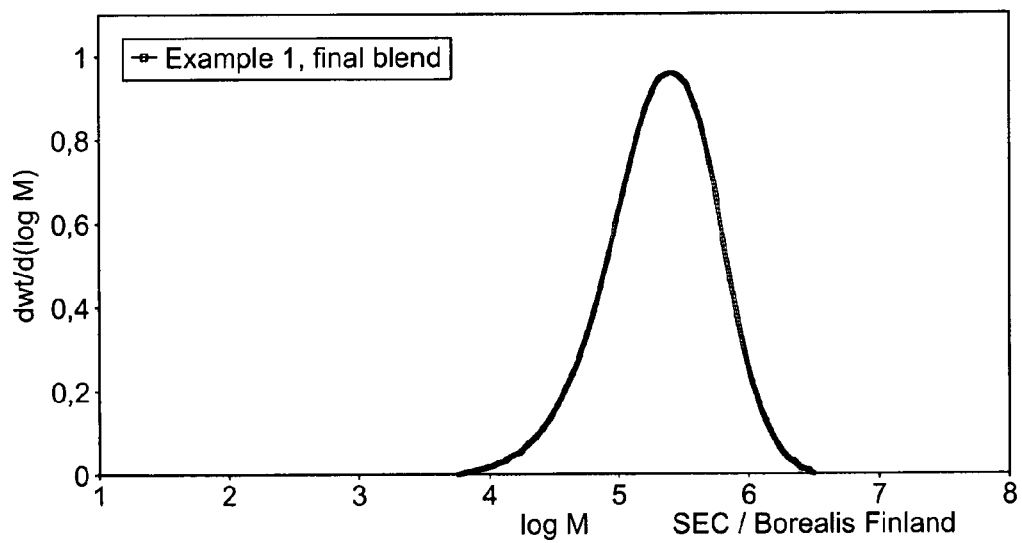
FIG. 2 is a GPC curve of polymer 1 of the examples, i.e. a unimodal polymer made in two reactors. $M_w/M_n=2.5$.

Any parameter mentioned above is measured according to the following protocols:

Melt Flow Rate

The melt flow rate (MFR) is determined according to ISO 1133 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight $M_w$, $M_n$ and MWD are measured by Gel Permeation Chromatography (GPC) according to the following method:

The weight average molecular weight $M_w$, and the molecular weight distribution (MWD=$M_w/M_n$ wherein $M_n$ is the number average molecular weight and $M_w$ is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend,
$w_i$ is the weight fraction of component "i" in the blend and
$Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the weight average molecular weight of the blend,
$w_i$ is the weight fraction of component "i" in the blend and
$Mn_i$ is the weight average molecular weight of the component "i".

Rheology

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap according to ASTM 1440-95. The oscillatory shear experiments were done within the linear viscosity range of strain at frequencies from 0.05 to 300 rads (ISO 6721-1). Five measurement points per decade were made. The method is described in detail in WO 00/22040.

The values of storage modulus (G'), loss modulus (G") complex modulus (G*) and complex viscosity (η*) were obtained as a function of frequency (ω).

Shear thinning index (SHI), which correlates with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362, and "*The influence of molecular structure on some rheological properties of polyethylene*", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 2.7 kPa and 210 kPa, then $\eta_{2.7}$ and η*(210 kPa) are obtained at a constant value of complex modulus of 2.7 kPa and 210 kPa, respectively. The shear thinning index $SHI_{2.7/210}$ is then defined as the ratio of the two viscosities $\eta^*_{2.7}$ and η*(210 kPa), i.e. η(2.7)/η(210).

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Particle Size Distribution

Average particle size was determined by sieving the polymer powder according to ASTM D1921-06. The screen set consisted of screens having openings of 4.000 mm, 2.000 mm, 0.850 mm, 0.355 mm, 0.250 mm and 0.100 mm.

Yellowness Index

Yellowness Index (YI) is a number calculated from spectrophotometric data that describes the change in color of a test sample from clear or white towards yellow. This test is most commonly used to evaluate color changes in a material caused by real or simulated outdoor exposure. The spectrophotometric instrument is a Spectraflash SF600 with ColorTools software which calculate the yellowness index E 313 according to ASTM E313. On the sample holder and pipe sample is tested.

The yellowness index is rated as follows:

|  | Rating 1 | Rating 2 | Rating 3 | Rating 4 |
|---|---|---|---|---|
| YI according to ASTM E313 | <(−0.9) | (−0.9)-1.5 | 1.5-6.5 | >6.5 |

Ash Content

For ash content<1000 ppm the so called "burning method" is employed.

Heat up two clean platinum cups at 870° C. for 15 minutes and afterwards cool them to room temperature in a desiccator Measure weight of the cups directly from the desiccator to 0.1 mg.

Weight 15 g of polymer powder into the platinum cups (to 0.1 mg), (after sieving the powder).

Burn up this powder in an burning device until all material has burnt (i.e. the flame dies).

Place the cups in a burning oven at 870° C. for 45 minutes.

Cool the cups in an desiccator to room temperature and measure the weight of the cups to 0.1 mg.

The weight of the ash content is the weight of the cup with ash content minus the weight of the empty cup.

Ash content calculation: (gram ash/gram original powder)*100=weight % ash content Torque:

The polymers were received as powders and were sieved before use. Only particles smaller than 2.0 mm in diameter are included. Each sample was prepared by adding 99.3 wt % polyethylene and 0.3 wt % antioxidant, Irganox B225 (received from Ciba), to a glass bottle. The bottles were shaken and to each sample, 0.4 wt % Trigonox 145 E85, received from Akzo Nobel) was added drop by drop. The total sample weight was 100 g.

Soaking was performed by rotation of samples during 20 h in a Heraeus Instruments rotation oven at room temperature.

After soaking, the polymer powder was compression moulded into circular discs (Ca: 3 mm thick. Diameter: 40 mm). in a Specac compression moulding machine. This was done at a temperature of 122° C., under a pressure of 5 kPa for 2 minutes, followed by cooling for 2 minutes under the same pressure. The cross-linking was performed in a Monsanto Rheometer (MDR 2000 E), an instrument which measures the torque (Nm or dNm) vs. time by oscillating movements (0.5 degrees with a moving frequny of 50 times per minute in air atmosphere) and it is therefore possible to study at what time the cross-linking starts and to what degree it is achieved. Measurements were performed for 5 minutes at 200° C., on two samples from each material. The parameter t90 is the time it takes to reach 90% of the final torque value achieved after the complete measuring time, in this case 5 minutes.

Degree of Crosslinking (XL, %)

Degree of cross-linking was measured by decaline extraction (Measured according to ASTM D 2765-01, Method A) on cross-linked material subjected to the Rheometer testing.

PREPARATION EXAMPLE 1

Preparation of the Catalyst

The catalyst complex used in the polymerisation examples was bis(n-butylcyclopentadienyl) hafnium dibenzyl, $(n-BuCp)_2Hf(CH_2Ph)_2$, and it was prepared according to "Catalyst Preparation Example 2" of WO2005/002744, starting from bis(n-butylcyclopentadienyl) hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and purged with nitrogen after silica addition Activated Catalyst System 10.0 kg activated silica (commercial silica carrier, XP02485A, having an average particle size 20 μm, supplier: Grace) was slurried into 21.7 kg dry toluene at room temperature. Then the silica slurry was added to 14.8 kg of 30 wt % methylalumoxane in toluene (MAO, supplied by Albemarle) over 3 hours. Afterwards the MAO/silica mixture was heated to 79° C. for 6 hours and then cooled down to room temperature again.

The resulting solution was reacted with 0.33 kg of $(n-BuCp)_2Hf(CH_2Ph)_2$ in toluene (67.9 wt %) for 8 hours at room temperature.

The catalyst was dried under nitrogen purge for 5.5 hours at 50° C.

The obtained catalyst had an Al/Hf mol-ratio of 200, an Hf-concentration of 0.44 wt % and an Al-concentration of 13.2 wt %.

POLYMERISATION EXAMPLES 1-2

Two-stage Polymerisation

A loop reactor having a volume of 500 $dm^3$ was operated at 85° C. and 58 bar pressure. Into the reactor were introduced propane diluent, hydrogen and ethylene. In addition, polymerisation catalyst prepared according to the description above was introduced continuously into the reactor so that the polymerisation rate was as shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 80° C. and a pressure of 20 bar. In addition ethylene and hydrogen were introduced into the reactor. The conditions are shown in Table 1.

The resulting polymer powder was transferred to a mixer, and 500 ppm Irganox 1076 (Ciba Specialty Chemicals) was added to the mixer and mixed for one hour to stabilize the polymer powder.

Using the polymerisation conditions described in table 1 below and the catalyst of Preparation Example 1, ethylene homopolymers were produced. A single stage comparative polymer was also made as described below using the same catalyst.

TABLE 1

|  |  | Polymer 1 | Polymer 2 | C.E. 1 |
|---|---|---|---|---|
| temperature | ° C. | 85 | 85 | 85 |
| pressure | bar | 58 | 58 | 58 |
| $C_2$ feed | kg/h | 38 | 38 | 38 |
| $H_2$ feed (formier 25%) | g/h | 2.9 | 4.1 | 0 |
| $C_2$ concentration | mol-% | 10.3 | 10.1 | 5.8 |
| $H_2/C_2$ ratio | mol/kmol | 0.05 | 0.07 | 0.05 |
| production rate | kg/h | 32.4 | 32.5 | 35.1 |
| Split | wt-% | 56 | 53 | 100 |
| $MFR_{21}$ | g/10 min | 2.0 | 2.1 | 0.6 |
| density | kg/m3 | 947 | 948 | 941 |
| $M_w$ |  | 253000 |  |  |
| $M_n$ |  | 107000 |  |  |
| ash content | ppm | 363 | 460 | 800 |
| GPR |  |  |  |  |
| temperature | ° C. | 80 | 80 | Not Used |
| pressure | bar | 20 | 20 |  |
| $C_2$ feed | kg/h | 78.7 | 90.1 |  |
| $H_2$ feed (formier 25%) | g/h | 1.2 | 3.5 |  |
| $C_2$ conc. | mol-% | 52 | 56 |  |
| $H_2/C_2$ ratio | mol/kmol | 0.11 | 0.14 |  |
| production rate | kg/h | 26 | 30 |  |
| Ash content | Ppm | 150 | 170 |  |
| $MFR_{21}$ | g/10 min | 0.8 | 1.1 |  |

Formier gas is a 25 mol % hydrogen in nitrogen mixture.

EXAMPLE 4

Further properties of the formed polymers are given in table 2. For comparison, two unimodal polymers formed in a single loop reactor are used. These are cross-linked in the same way.

In order to determine the degree of cross-linking, the polymers are cross-linked using 0.4% Trigonox 145 E85 as described above in the analytical test section.

TABLE 2

| | Designation | | |
|---|---|---|---|
| | CE1 | 1 | 2 |
| | Production mode | | |
| | One reactor | two reactors | two reactors |
| $\eta^*_{0.05}$ (Pas) |  | 185000 | 125000 |
| $\eta^*_{2.7}$ (Pas) |  | 238000 | 136000 |
| $\eta^*_5$ (Pas) |  | 210000 | 128000 |
| Density (kg/m³) | 941 | 945.6 | 945.9 |
| $MFR_{21}$ (g/10 min) | 0.6 | 0.82 | 1.1 |
| $MFR_5$ (g/10 min) |  | 0.12 | 0.16 |
| $SHI_{2.7/210}$ |  | 3.4 | 2.5 |

TABLE 2-continued

| | Designation | | |
|---|---|---|---|
| | CE1 | 1 | 2 |
| | Production mode | | |
| | One reactor | two reactors | two reactors |
| $M_n$ (g/mol) | 136500 | 127000 |  |
| $M_w$ (g/mol) | 320000 | 321000 |  |
| $M_w/M_n$ | 2.3 | 2.5 |  |
| Ash content (ppm) | 800 | 150 | 170 |
| Max torque (dNm) |  | 16.6 | 16 |
| T90 (min) |  | 2.8 | 2.9 |
| XL, % (perox) |  | 89 | 86.7 |

EXAMPLE 5

Ash Content of Non Cross-Linked Polymer:
Polymers 1-2 (two reactors, 150-170 ppm average=160 ppm)
CE1=800 ppm.

In table 3, the correlation between yellowness index and ash content is shown for known single site resins in the form of pipes.

TABLE 3

| Yellowness index | Ash content (ppm) |
|---|---|
| 1 | <250 |
| 3 | 540 |
| 4 | 710 |
| 4 | 1680 |
| 4 | 2765 |

The table shows therefore that the low ash contents associated with the polymers of this invention are also associated with low yellowness indices in articles made therefrom.

EXAMPLE 6

In Table 4 the ash content of different particle size fractions is shown. It is obvious that the average ash content is considerably higher if only one reactor (loop) is run as compared to a two reactor made material (loop and GPR). It is also evident that the average ash content is higher for smaller particles as these are predominantly made in the loop (see FIG. 1).

TABLE 4

| Ash content vs particle size for Polymer 1. | | |
|---|---|---|
| | Ash content (ppm) | |
| sieve size (mm) | One reactor | Two reactors |
| 0.355 | 327 | 220 |
| 0.250 | 366 | 242 |
| 0.100 | 441 | 268 |

What is claimed is:
1. A process for the preparation of a unimodal ethylene homopolymer with a density of less than 955 kg/m³ and having a shear thinning index $SHI_{2.7/210}$ of less than 5 comprising:

(I) polymerizing ethylene in a first stage in the presence of a single site catalyst;
(II) polymerizing ethylene in a second stage in the presence of the same single site catalyst and in the presence of the product of step (I);
so as to form the unimodal ethylene homopolymer having an Mw/Mn of less than 3.

2. The process according to claim 1 wherein the unimodal ethylene homopolymer comprises a first component and a second component.

3. The process according to claim 2 wherein the first component comprises a loop phase polymer.

4. The process according to claim 2 wherein the second component is made in a gas phase process.

5. The process according to claim 1 wherein the unimodal ethylene homopolymer comprises an ash content of less than 250 ppm.

6. The process according to claim 2 wherein the first component comprises an ash content of at least 250 ppm.

7. The process according to claim 1 wherein the unimodal ethylene homopolymer comprises an $SHI_{2.7/210}$ of less than 4.

8. The process according to claim 1 wherein the unimodal ethylene homopolymer comprises an $MFR_{21}$ of less than 5 g/10 min.

9. The process according to claim 1 wherein the unimodal ethylene homopolymer comprises a single peak in its GPC curve.

10. The process according to claim 2 wherein a weight ratio between the two components in the unimodal ethylene homopolymer is 40:60 to 60:40.

11. A process for the preparation of a cross-linked polyethylene comprising:
cross-linking the unimodal ethylene homopolymer prepared according to the process of claim 1;
so as to form the cross-linked polyethylene.

12. The process according to claim 11 wherein the cross-linked polyethylene comprises a cross-linking degree of at least 70% (ASTM D2765-01, method A using Trig 145 E85).

13. A process for the preparation of a cross-linked pipe comprising:
conducting RAM extrusion with the cross-linked polyethylene prepared according to the process of claim 9.

14. The process according to claim 13 wherein a cross-linking agent comprises a peroxide.

* * * * *